United States Patent [19]

Endoh

[11] Patent Number: 5,758,207
[45] Date of Patent: May 26, 1998

[54] ZOOM LENS CAMERA HAVING A BUILT-IN STROBE

[75] Inventor: Yasuhiko Endoh, Tokyo, Japan

[73] Assignee: Asahi Kogaku Kogyo Kabushiki Kaisha, Tokyo, Japan

[21] Appl. No.: 735,744

[22] Filed: Oct. 23, 1996

[30] Foreign Application Priority Data

Oct. 31, 1995 [JP] Japan .................... 7-283190

[51] Int. Cl.⁶ .................... G03B 17/00
[52] U.S. Cl. .................... 396/85; 396/155
[58] Field of Search .................... 396/85, 155

[56] References Cited

U.S. PATENT DOCUMENTS 5,079,574 1/1992 Ueno .
5,233,378 8/1993 Hosokawa et al. .
5,287,135 2/1994 Arai et al. .
5,438,381 8/1995 Mogamiya et al. .................... 396/85
5,539,622 7/1996 Ishikawa .

*Primary Examiner*—Russell E. Adams
*Attorney, Agent, or Firm*—Greenblum & Bernstein P.L.C.

[57] ABSTRACT

A zoom lens camera having a built-in strobe includes a light source, a strobe unit which is provided with a reflector to reflect flash light emitted from the light source in front of the camera, and a zoom lens which is driven by a motor. The motor is located behind the strobe unit and has a drive shaft whose axis extends in a plane substantially perpendicular to the optical axis of the zoom lens.

7 Claims, 5 Drawing Sheets

ZOOM LENS CAMERA HAVING A BUILT-IN STROBE

BACKGROUND OF THE INVENTION

1. Field of the Invention

The present invention relates to a zoom lens camera having a built-in strobe (electronic flash).

2. Description of the Related Art

In general, in a known zoom lens camera having a motor-driven zoom lens, a strobe unit is having a xenon lamp (tube) and a reflector which reflects light, emitted from the xenon lamp, is incorporated in front of the camera. In such a built-in flash camera, the strobe unit and a control board therefor, are provided in an upper accommodation space formed on one side of the camera body. The height of the accommodation space is at least substantially identical to an opening portion of the reflector, and occupies a relatively large inner space of the camera body.

Furthermore, in such a camera, the motor which drives the zoom lens is provided in an inner space of the camera body separate from the inner accommodation space used for the control board. This spaces prevents miniaturizing the camera body.

SUMMARY OF THE INVENTION

It is an object of the present invention to provide a zoom lens camera having a built-in strobe in which the inner accommodation space of the camera body for the strobe unit can be effectively utilized to thus realize a compact camera body.

To achieve the object mentioned above, according to the present invention, a zoom lens camera is provided having a built-in strobe comprising a light source. A strobe unit is provided with a reflector to reflect flash light emitted from the light source in front of the camera, and a zoom lens is driven by a motor. The motor is located behind the strobe unit and is provided with a drive shaft whose axis extends in a plane substantially perpendicular to the optical axis of the zoom lens.

The strobe unit can be provided in an upper space of a body of the camera on one side thereof. The axis of the drive shaft of the motor located behind the strobe unit can extend outwardly as viewed from a front of the camera and is inclined downwardly with respect to a horizontal plane (longitudinal direction of the camera).

Provision can be made for a reduction mechanism which decelerates and transmits the rotation of the motor to a drive mechanism of the zoom lens. The reduction mechanism consists of a worm secured to the drive shaft of the motor and a worm wheel which is engaged by the worm.

Preferably, the worm wheel is provided with a shaft which extends substantially parallel to the optical axis and which is provided with an over-load releasing mechanism between the motor and the drive mechanism for the zoom lens.

The present disclosure relates to subject matter contained in Japanese Patent Application No. 7-283190 (filed on Oct. 31, 1995) which is expressly incorporated herein by reference in its entirety.

BRIEF DESCRIPTION OF THE DRAWINGS

The invention will be discussed below in detail with reference to the attached drawings, in which similar elements are indicated by similar reference numerals, and wherein.

DESCRIPTION OF THE PREFERRED EMBODIMENT

Figure 1:
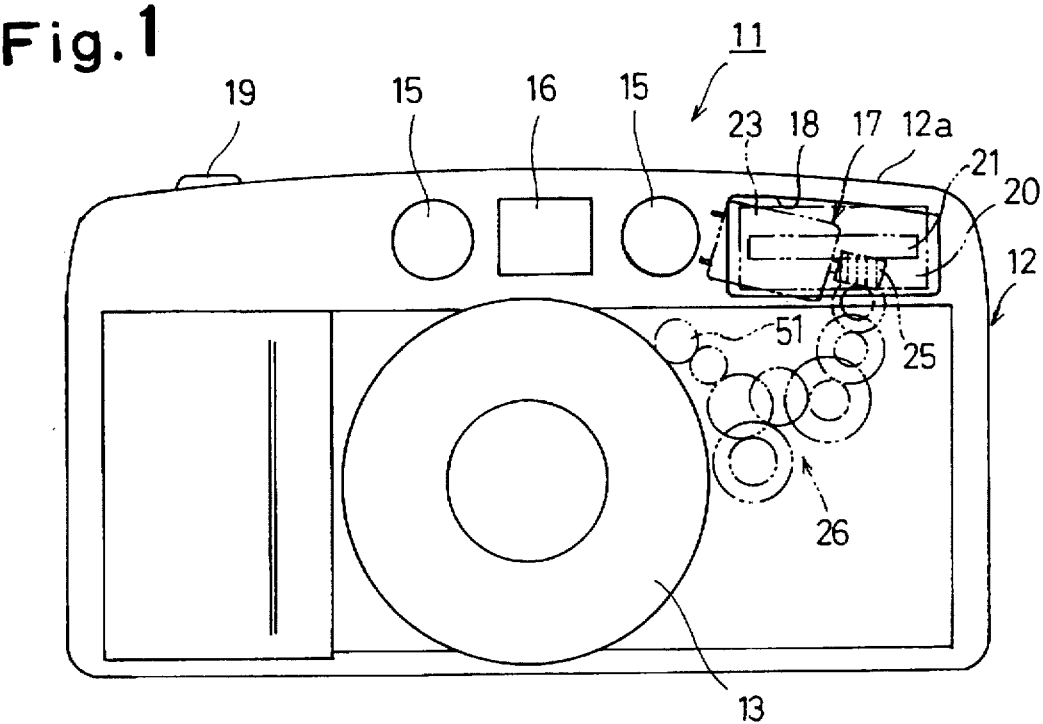
FIG. 1 is a front elevational view of a zoom lens camera having a built-in strobe according to the present invention.
Figure 2:
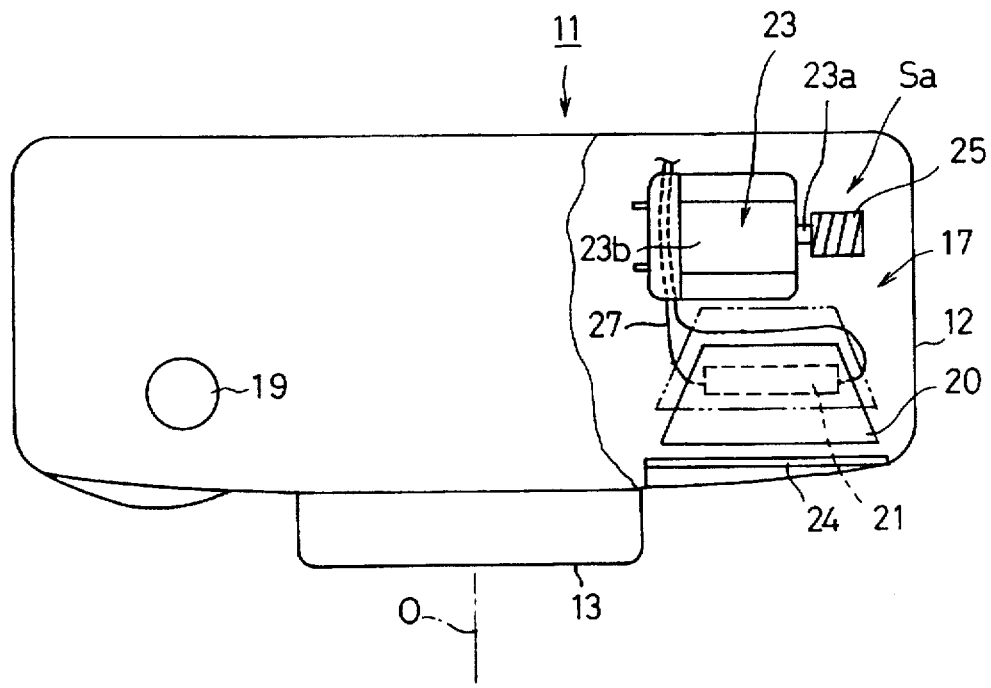
FIG. 2 is a plan view of the zoom lens camera shown in FIG. 1.
Figure 3:
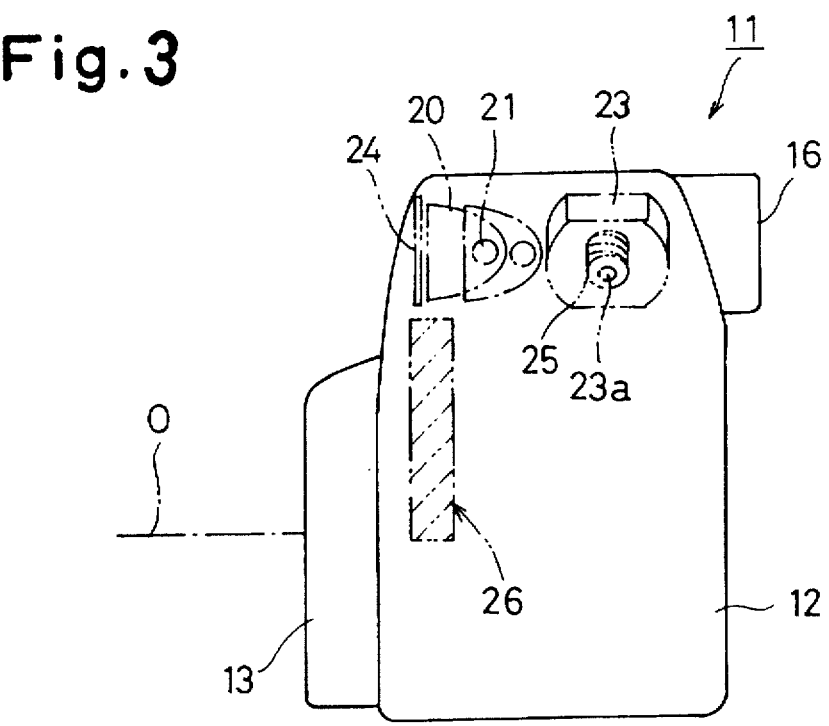
FIG. 3 is a side elevational view of the zoom lens camera shown in FIG. 1.
Figure 4:
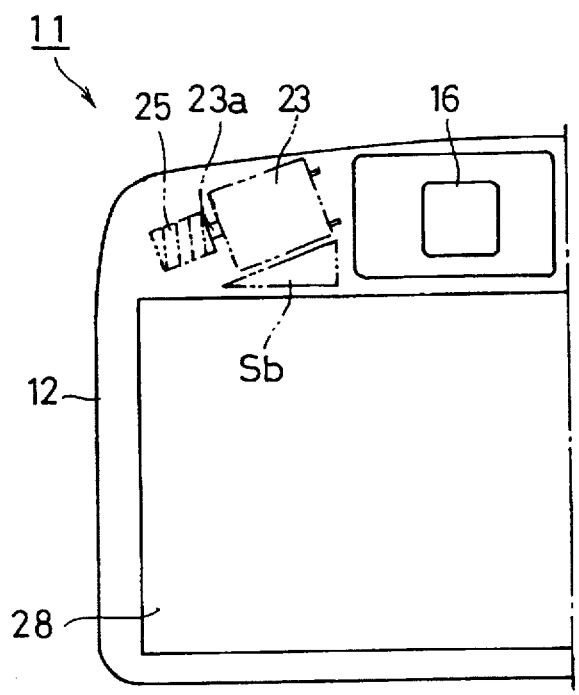
FIG. 4 is a back view of a left half of the zoom lens camera shown in FIG. 1.

As can be seen in FIGS. 1 through 4, a camera 11 is provided with a shutter button 19 at one end of an upper surface of a camera body 12, a zoom lens 13 at a center portion of a front surface of the camera body 12, and an AF unit 15 and a finder window 16, on the front surface of the camera body 12, above the zoom lens 13.

A strobe unit (flash light emitting unit) 17 is provided in a front portion of an accommodation space Sa (FIG. 2) formed in an upper right corner of the camera body 12, as viewed in FIG. 1. The strobe unit 17 consists of a xenon tube (light source) 21 and a reflector 20. The reflector 20 reflects flash light emitted from the xenon tube 21 towards the in front of the camera. The reflector 20 is associated with the zoom lens 13 by an association mechanism (not shown), so that the reflector 20 moves parallel to an optical axis O of the zoom lens 13 during a zooming operation to vary the distance between the reflector 20 and a Fresnel lens 24; this change an illuminating angle of the flash light incident upon an object to be photographed.

A strobe opening 18, opposed to the reflector 20, is formed in the front wall of the camera body 12. The Fresnel lens 24 is fitted in the strobe opening 18. The height of the accommodation space Sa is at least substantially identical to the height of the strobe opening for the reflector 20. In the Figures, reference numeral 27 designates a conductor which electrically connects the xenon tube 21 and a control board (not shown) to control the emission of the flash light from the xenon tube 21.

A motor 23, which drives the zoom lens 13, is provided in the accommodation space Sa behind the strobe unit 17, so not to interfere with the reflector 20 when the reflector 20 moves to its rearmost position. The motor 23 has a drive shaft 23a which extends in a plane substantially perpendicular to the optical axis O of the zoom lens 13. The arrangement of the drive motor 23 makes it possible to effectively utilize the rear portion of the accommodation space Sa behind the strobe unit 17. Moreover since, contrary to a conventional camera, there is no need to provide separate space for the drive motor 23, the camera body 12 can be made smaller and more compact.

Figure 7:
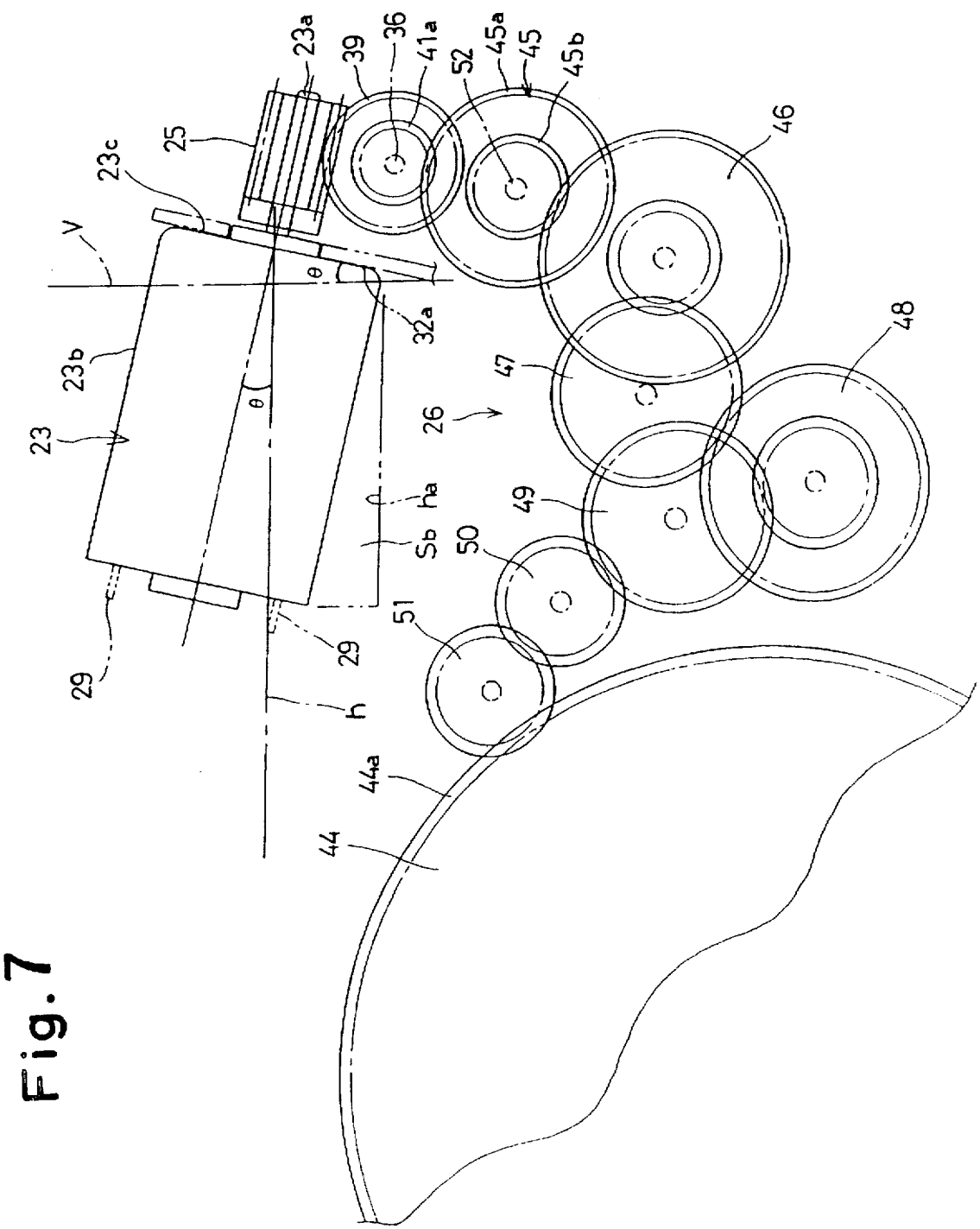
FIG. 7 is a front elevational view of a main part of a transmission mechanism which transmits the rotation of the rotation transmission mechanism to a zoom lens.

The drive shaft 23a of the drive motor 23 extends in a rightward direction as viewed from the front of the camera 11 and is inclined downward with respect to the horizontal direction (longitudinal direction of the camera). Upper flat surface 23b of the motor 23 is also inclinded with respect to the horizontal direction. Namely, the motor 23 is secured to the camera body 12 so that the axis of the drive shaft 23a is inclined at an inclination angle θ with respect to the horizontal direction "h" when the camera body 12 is placed on a horizontal surface (FIG. 7). Consequently, it is possible to incline or curve an outer wall portion 12a of the upper surface of the camera body 12 to correspond to the contour of the motor 23. The inclined wall portion 12a gives the impression that the camera body is small.

Furthermore, a wedge-shaped space Sb is defined by the lower portion of the motor 23 and the horizontal plane ha (FIG. 7). The conductor 27 (FIG. 2) extends through the wedge-shaped space Sb to electrically connect the xenon tube 21 and the control board (not shown) of the camera body 12. Note that reference numeral 28 designates a back cover of the camera 11.

The zoom lens 13 is provided with a cam ring 44 (FIG. 7) coaxial to a movable lens barrel (not shown). When the cam ring 44 is rotated relative to the movable lens barrel, the movable lens barrel is moved along the optical axis direction to move a plurality of lens groups (not shown) to effect the zooming operation. Rotation of the drive motor 23 is reduced and transmitted to a drive mechanism for the cam ring 44, and accordingly, drives the zoom lens 13 through a rotation transmission mechanism (reduction mechanism) 38 and a reduction gear train (reduction mechanism) 26.

The reduction gear train 26, provided in the front portion of the camera body 12, consists of a number of gears 45 through 51 (FIG. 7) which are supported rotatably by respective shafts substantially parallel to the optical axis 0 in the camera body 12, and which are covered by a cover member 34. Among the gears 45 through 51, for example, a first gear (driven gear) 45 is supported rotatably by a shaft 52 which extends parallel to the optical axis O of the zoom lens 13. gear 45 is provided with a large diameter portion 45a which meshes with a gear portion 41a of a rotation transmission gear 41 (discussed hereinafter), and a small diameter portion 45b which meshes with a gear 46. A last gear 51 of the reduction gear train 26 meshes with an outer peripheral gear 44a of the cam ring 44. Note that reference numeral 29 designates the terminals of the drive motor 23, which can be connected to a power source.

The method of mounting the motor 23 to the camera body 12, and the rotation transmission mechanism 38 provided between the motor 23 and the first gear 45, will be discussed below.

Figure 5:
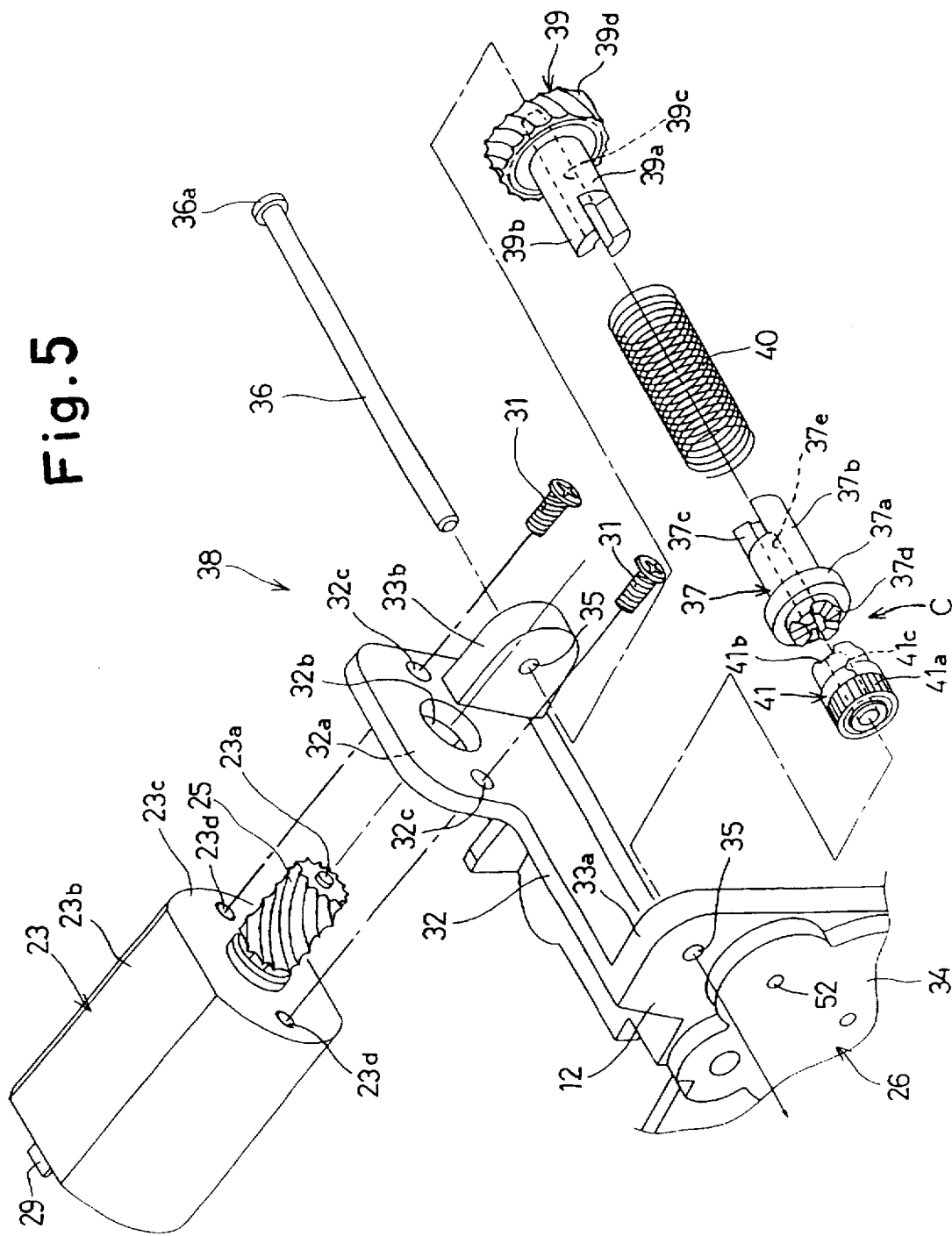
FIG. 5 is a perspective view of a rotation transmission mechanism in a zoom lens camera having a built-in strobe according to the present invention.
Figure 6:
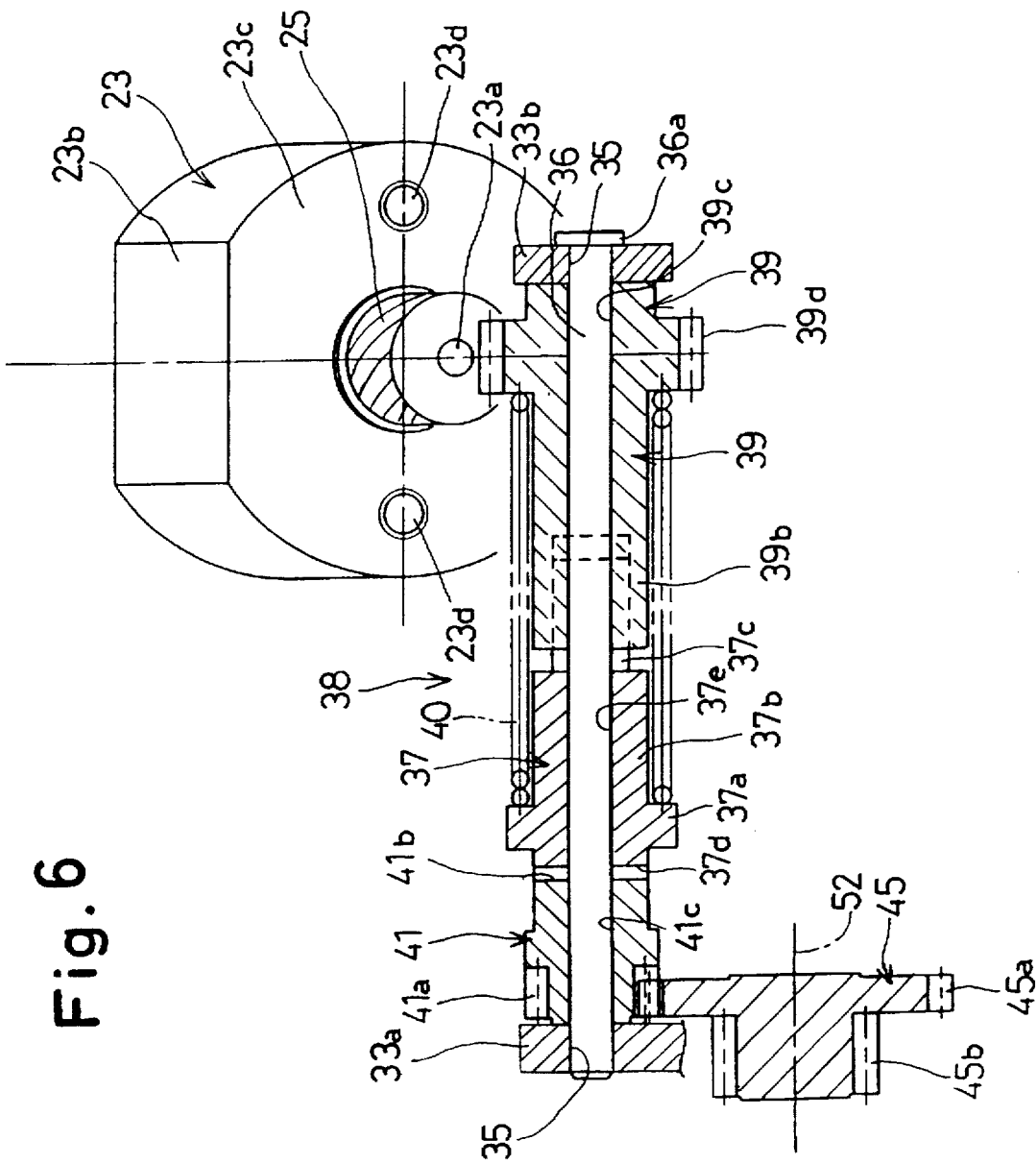
FIG. 6 is a side sectional view of the rotation transmission mechanism shown in FIG. 5.

As shown in FIG. 5, the camera body 12 is provided with a supporting portion 32 which extends rearwardly to correspond to the reduction gear train 26. The supporting portion 32 has an abutment surface 32a which can be brought into contact with a positioning surface (front surface) 23c of the motor 23. The abutment surface 32a is inclined at an inclination angle θ with respect to a vertical direction "v" (FIG. 7) when the camera body 11 is placed on a horizontal surface.

The abutment surface 32a is provided with a through hole 32b in which a worm 25 secured to the drive shaft 23a of the motor 23 is inserted. The abutment surface 32a is also provided with a pair of screw insertion holes 32c corresponding to a pair of threaded holes 23d formed in the positioning surface 23c. The screw insertion holes 32c are located on left and right sides of the through hole 32b. The motor 23 is secured to the camera body 12 by screws 31, which are inserted in the insertion holes 32c and screwed in the threaded holes 23d. Drive shaft 23a of the motor 23 (and the worm 25) is inserted in the through hole 32b of the supporting portion 32 and the positioning surface 23c abuts against the abutment surface 32a. That is, the positioning surface 23c is inclined at an inclination angle θ with respect to the horizontal direction "h".

The supporting portion 32 is provided with parallel brackets 33a and 33b which support a shaft 36 having a head 36a, extending perpendicular to the drive shaft 23a of the motor 23. The brackets 33a and 33b are each provided with a supporting hole 35 through which the shaft 36 extends. The bracket 33a is provided on the rear side of the cover member 34. The bracket 33b is provided in the vicinity of the insertion hole 32b.

The shaft 36 which extends through the supporting holes 35 between the brackets 33a and 33b rotatably extends through a shaft hole 39c of a worm wheel 39 engaged by the worm 25. A shaft 39a of the worm wheel 39 extends substantially parallel to the optical axis O of the zoom lens 13, and is provided thereon with an over-load releasing mechanism (over-load clutch mechanism) C between the motor 32 and the drive mechanism of the zoom lens 13.

The shaft 39a of the worm wheel 39 has a diameter smaller than the diameter of a gear portion 39d, and is provided on a front end thereof with a bifurcated engaging pawl 39b. The shaft 36 relatively rotatably extends through an axial hole 37e of a clutch member 37 and an axial hole 41c of the rotation transmission gear 41. The clutch member 37 is movable along the optical axis direction relative to the worm wheel 39, but rotates together with the worm wheel 39 when an engaging pawl 37c of the clutch member 37 engages the engaging pawl 39b. A compression spring 40 is provided having a diameter smaller than the diameter of a flange 37a or the diameter of the large diameter gear portion 39d, but larger than the diameter of the shafts 39a and 37b. The compression spring 40 is located between the worm wheel 39 and the clutch member 37a in a compressed state. The clutch member 37 is also provided with a plurality of clutch teeth 37d in front of the flange 37a.

The rotation transmission gear 41 consists of the abovementioned gear portion 41a and axial hole 41c, and a plurality of clutch teeth 41b which are selectively engaged by the clutch teeth 37d. The clutch teeth 37d and 41b which constitute the over-load releasing mechanism C are normally engaged with each other by the compression spring 40 so as to rotate together. If a load above a predetermined value is applied to the reduction gear train side, the clutch teeth 37d are disengaged from and ride over the clutch teeth 41b while moving the clutch member 37 toward the worm wheel 39 against the compression spring 40. Namely, in an overloaded state, the clutch member 37 idles with respect to the rotation transmission gear 41, and hence there is no problem that the reduction mechanism, will forcibly rotate the reduction gear train 26 with a large torque. To effectively utilize the inner space of the camera, the over-load releasing mechanism C is provided in the space defined between the worm wheel 39 which is laterally opposed to the drive shaft 23a of the drive motor 23 and the reduction gear train 26 provided in the front portion of the camera body 12.

The zoom lens camera having a built-in strobe constructed as mentioned above operates as follows.

When a zoom operation lever (not shown) is moved to a telephoto position or a wide-angle position, the motor 23 is driven to rotate in a direction corresponding thereto. Consequently, the rotation is transmitted from the worm 25 to the worm wheel 39 whose shaft extends in a direction perpendicular to the axis of the shaft 23a of the motor 23, and is then transmitted to the driven gear 45 and the reduction gear train 26 through the clutch member 37 and the rotation transmission gear 41. Thus, the cam ring 44 is rotated in the corresponding direction to advance or retract the zoom lens 13 in the optical axis direction, so that the lens groups are moved in accordance with a predetermined relationship therebetween to execute the zooming operation.

The reflector 20 of the strobe unit 17 is moved in a direction parallel to the optical axis O together with the xenon tube 21 through the association mechanism (not shown). If the shutter button 19 is depressed when the brightness of an object to be photographed is insufficient in an automatic photographing mode, or when a compulsive light emission mode is selected, the shutter is actuated through a shutter mechanism (not shown) and the light emitting voltage is applied to the xenon tube 21 from a condenser (not shown) through the conductor 27, so that the xenon tube 21 emits flash light. Since the position of the reflector 20 relative to the Fresnel lens 24 changes in association with the zooming operation of the zoom lens 13, the flash light emitted from the xenon tube 21 is directed toward the object at an appropriate illumination angle.

The drive shaft 23a of the motor 23 extends in a plane perpendicular to the optical axis O and is laterally disposed behind the reflector 20. Rotation of the motor 23 is transmitted to the worm wheel 39 through the worm 25, and is then smoothly transmitted to the zoom lens 13 through the reduction gear train 26 provided in the front portion of the camera body 12. In this state, even if a load above a predetermined value acts on the reduction gear train side, (for example, when the zoom lens 13 is held by an operator), the worm wheel 39 idles due to the over-load releasing mechanism C. Hence no forced movement of the zoom lens 13 by a large torque occurs.

Although the direction of the drive shaft is changed by 90° using the reduction mechanism consisting of the worm 25 and the worm wheel 39 in combination in the illustrated embodiment, the present invention is not limited thereto. Namely, the direction of the drive shaft can be changed by 90°. For example using a mechanism consisting of two bevel gears, two screw gears, or a combination of a pinion and a crown gear, etc.

Also, although the over-load releasing mechanism C consists of the clutch teeth 37d and 41b which are selectively engaged in the illustrated embodiment, the present invention is not limited thereto. Namely, the clutch teeth 37d and 41b can be replaced by a pawl-clutch mechanism consisting of two claws provided on the clutch member 37 and the rotation transmission gear 41 to selectively engage with each other. Alternatively, it is also possible to employ a friction-clutch mechanism consisting of friction engagement members which are provided on the clutch member 37 and the rotation transmission gear 41 to selectively engage with each other, instead of the clutch teeth 37d and 41b.

As can be understood from the above discussion, according to the present invention, in a zoom lens camera having a built-in strobe, since the motor for driving the zoom lens is located in the rear space of the strobe unit, with the drive shaft whose axis extends in a plane substantially perpendicular to the optical axis of the zoom lens, the accommodation space for the strobe unit can be effectively utilized. Thus, according to the present invention, a small and compact camera body can be obtained.

What is claimed is:

1. A zoom lens camera having a built-in strobe, comprising:

a light source;

a strobe unit having a reflector to reflect flash light emitted from said light source in front of said camera;

a motor; and a zoom lens driven by said motor, said motor being located with respect to said strobe unit, said motor having a drive shaft whose axis extends in a plane substantially perpendicular to the principle optical axis of said zoom lens;

wherein a reference axis, substantially parallel to said principle optical axis, passes through said motor and said strobe unit.

2. The zoom lens camera having a built-in strobe according to claim 1, said camera including top, bottom and lateral sides said top and bottom sides defined when said zoom lens is below said strobe unit wherein said strobe unit is provided adjacent said top side of said camera and wherein said axis of said drive shaft of said motor extends toward one of said lateral sides and is inclined at an acute angle with respect to said bottom side.

3. The zoom lens camera having a built-in strobe according to claim 1, further comprising a drive mechanism said reduction mechanism which and transmits the rotation of said motor to a drive mechanism of said zoom lens.

4. The zoom lens camera having a built-in strobe according to claim 3, wherein said reduction mechanism includes said worm secured to said drive shaft of said motor and a worm wheel engaged by said worm.

5. The zoom lens camera having a built-in strobe according to claim 4, wherein said worm wheel is provided with a shaft extending substantially parallel to said optical axis, and which is provided thereon with an overload releasing mechanism between said motor and said drive mechanism of said zoom lens.

6. The zoom lens camera having a built-in strobe according to claim 2, wherein a bottom of said motor, and a horizontal plane including a first end of said bottom edge define a wedge-shaped space.

7. The zoom lens camera having a built-in strobe according to claim 6, further comprising a control board, wherein said wedge-shaped space is provided with a conductor wire which connects said light source and said control board.

* * * * *